(«12») United States Patent
Yang et al.

(10) Patent No.: US 7,250,229 B2
(45) Date of Patent: Jul. 31, 2007

(54) PROCEDURE FOR STARTING UP A FUEL CELL SYSTEM HAVING AN ANODE EXHAUST RECYCLE LOOP

(75) Inventors: Deliang Yang, Houston, TX (US); Margaret M. Steinbugler, East Windsor, CT (US); Richard D. Sawyer, Groveton, NH (US); Leslie L. Van Dine, Manchester, CT (US); Carl A. Reiser, Stonington, CT (US)

(73) Assignee: UTC Power Corporation, South Windsor, CT (US)

( * ) Notice: Subject to any disclaimer, the term of this patent is extended or adjusted under 35 U.S.C. 154(b) by 20 days.

(21) Appl. No.: 11/231,285

(22) Filed: Sep. 20, 2005

(65) Prior Publication Data

US 2006/0093879 A1    May 4, 2006

Related U.S. Application Data

(63) Continuation of application No. 10/189,696, filed on Jul. 3, 2002, now abandoned, which is a continuation of application No. PCT/US02/00078, filed on Jan. 4, 2002, which is a continuation of application No. 09/769,897, filed on Jan. 25, 2001, now abandoned.

(51) Int. Cl.
*H01M 8/06* (2006.01)
(52) U.S. Cl. ............................... 429/17; 429/13
(58) Field of Classification Search .................. 429/13, 429/14, 17
See application file for complete search history.

(56) References Cited

U.S. PATENT DOCUMENTS

| 4,555,452 A | * | 11/1985 | Kahara et al. | ............... | 429/13 |
| 6,612,830 B2 | * | 9/2003 | Berry et al. | ............... | 431/7 |
| 2002/0182456 A1 | * | 12/2002 | Condit et al. | ............... | 429/13 |

OTHER PUBLICATIONS

"Fuel Cell Systems", edited by Leo J.M.J. Blomen and Michael N. Mugerwa, Plenum Press, New York, New York, 1993, pp. 238, 239. 336.*

* cited by examiner

*Primary Examiner*—Susy Tsang-Foster
*Assistant Examiner*—Cynthia Lee
(74) *Attorney, Agent, or Firm*—Andrew D. Gathy

(57) ABSTRACT

A procedure for starting up a fuel cell system that is disconnected from its primary load and that has air in both its cathode and anode flow fields includes a) connecting an auxiliary resistive load across the cell to reduce the cell voltage; b) initiating a recirculation of the anode flow field exhaust through a recycle loop and providing a limited flow of hydrogen fuel into that recirculating exhaust; c) catalytically reacting the added fuel with oxygen present in the recirculating gases until substantially no oxygen remains within the recycle loop; disconnecting the auxiliary load; and then d) providing normal operating flow rates of fuel and air into respective anode and cathode flow fields and connecting the primary load across the cell. The catalytic reaction may take place on the anode or within a catalytic burner disposed within the recycle loop. The procedure allows start-up of the fuel cell system without the use of an inert gas purge while minimizing dissolution of the catalyst and corrosion of the catalyst support during the start-up process.

23 Claims, 2 Drawing Sheets

PROCEDURE FOR STARTING UP A FUEL CELL SYSTEM HAVING AN ANODE EXHAUST RECYCLE LOOP

This application is a continuation of U.S. patent application Ser. No. 10/189,696, filed Jul. 3, 2002, now abondoned which is a continuation of PCT application Ser. No. PCT/US02/00078 filed Jan. 4, 2002, which is a continuation of U.S. patent application Ser. No. 09/769,897, filed Jan. 25, 2001, now abandoned, the contents of which are incorporated by reference.

BACKGROUND OF THE INVENTION

1. Technical Field

This invention relates to fuel cell systems and, more particularly, to procedures for starting up a fuel cell system.

2. Background Information

It is well known in the fuel cell art that, when the electrical circuit is opened and there is no longer a load across the cell, such as upon and during shut-down of the cell, the presence of air on the cathode, coupled with hydrogen fuel remaining on the anode, often cause unacceptable anode and cathode potentials, resulting in catalyst and catalyst support oxidation and corrosion and attendant cell performance degradation. It was thought that inert gas needed to be used to purge both the anode flow field and the cathode flow field immediately upon cell shut-down to passivate the anode and cathode so as to minimize or prevent such cell performance degradation. Further, the use of an inert gas purge avoided the possible occurrence of a flammable mixture of hydrogen and air, which is a safety issue. While the use of 100% inert gas as the purge gas is most common in the prior art, commonly owned U.S. Pat. Nos. 5,013,617 and 5,045,414 describe using 100% nitrogen as the anode side purge gas, and a cathode side purging mixture comprising a very small percentage of oxygen (e.g. less than 1%) with a balance of nitrogen. Both of these patents also discuss the option of connecting a dummy electrical load across the cell during the start of purge to lower the cathode potential rapidly to between the acceptable limits of 0.3-0.7 volt.

It is undesirable to use nitrogen or other inert gas as a shut-down or start-up purge gas for fuel cells where compactness and service interval of the fuel cell powerplant is important, such as for automotive applications. Additionally, it is desired to avoid the costs associated with storing and delivering inert gas to the cells. Therefore, safe, cost effective shut-down and start-up procedures are needed that do not cause significant performance degradation and do not require the use of inert gases, or any other gases not otherwise required for normal fuel cell operation.

BRIEF SUMMARY OF THE INVENTION

In accordance with the present invention, a procedure for starting up a fuel cell system that is disconnected from its primary load and has air in both its cathode and anode flow fields includes a) initiating a recirculation of the anode flow field exhaust through a recycle loop and providing a limited flow of fuel into the recirculating exhaust; b) catalytically reacting the hydrogen and oxygen in the fuel and air mixture as it recirculates until substantially no oxygen remains in the recycle loop; and then c) increasing the fuel flow rate into the anode flow field to normal operating levels and thereafter connecting the primary load across the cell.

Preferably an auxiliary resistive load is connected across the cell as the oxygen is being consumed to reduce the cell voltage during the process. The use of a diffusion burner and separate catalytic burner in the recycle loop, or a catalytic burner alone, is also advantageous to speed up the removal of oxygen.

In one experiment using a stack of PEM fuel cells of the general type described in commonly owned U.S. Pat. No. 5,503,944, the primary electricity using device was disconnected, and the flow of fuel (hydrogen) to the anode and the flow of air to the cathode were shut off. No attempt was made to purge the anode flow field of residual fuel or to purge the cathode flow field of air, such as by using an inert gas purge. To restart the cell, fuel and oxidant were flowed directly into their respective flow fields. (The foregoing procedure is hereinafter referred to as an "uncontrolled" start/stop cycle.) It was found that a cell stack assembly operated in this manner experienced rapid performance decay which had not previously been observed. Further, it was discovered that a large number of start/stop cycles were more detrimental to cell performance than were a large number of normal operating hours under load. It was eventually determined, through experimentation, that both the shut-down and start-up procedures were contributing to the rapid performance decay being experienced by the cell; and it was known that such rapid decay did not occur when, in accordance with prior art techniques, inert gas was used to passivate the cell at each shut down. Examination of used cells that experienced only a few dozen uncontrolled start/stop cycles showed that 25% to 50% of the high surface area carbon black cathode catalyst support was corroded away, which had not previously been reported in the prior art.

Further testing and analysis of results led to the belief that the following mechanism caused the performance decay experienced in the foregoing experiment: With reference to FIG. 2, a diagrammatic depiction of a PEM fuel cell is shown. (Note that the mechanism to be described is also applicable to cells using other electrolytes, such as phosphoric acid or potassium hydroxide with appropriate changes in ion fluxes.) In FIG. 2, M represents a proton exchange membrane (PEM) having a cathode catalyst layer C on one side and an anode catalyst layer A on the other side. The cathode air flow field carrying air to the cathode catalyst is divided into air zones 1 and 2 by a vertical dotted line that represents the location of a moving hydrogen front through the anode flow field, as further described below. The anode fuel flow field that normally carries hydrogen over the anode catalyst from an inlet I to an exit E is also divided into two zones by the same dotted line. The zone to the left of the dotted line and adjacent the inlet I is filled with hydrogen and labeled with the symbol $H_2$. The zone to the right of the dotted line and adjacent the exit E is zone 3 and is filled with air.

Upon an uncontrolled shut-down (i.e. a shut-down without taking any special steps to limit performance decay) some of the residual hydrogen and some of the oxygen in their respective anode and cathode flow fields diffuse across the PEM (each to the opposite side of the cell) and react on the catalyst (with either oxygen or hydrogen, as the case may be) to form water. The consumption of hydrogen on the anode lowers the pressure in the anode flow field to below ambient pressure, resulting in external air being drawn into the anode flow field at exit E creating a hydrogen/air front (the dotted line in FIG. 2) that moves slowly through the anode flow field from the fuel exit E to the fuel inlet I. Eventually the anode flow field (and the cathode flow field) fills entirely with air. Upon start-up of the cell, a flow of air is directed into and through the cathode flow field and a flow of hydrogen is introduced into the anode flow field inlet I.

On the anode side of the cell this results in the creation of a hydrogen/air front (which is also represented by the dotted line in FIG. 2) that moves across the anode through the anode flow field, displacing the air in front of it, which is pushed out of the cell. In either case, (i.e. upon shut-down and upon start-up) a hydrogen/air front moves through the cell. On one side of the moving front (in the zone $H_2$ in FIG. 2) the anode is exposed substantially only to fuel (i.e. hydrogen); and in zone 1 of the cathode flow field, opposite zone $H_2$, the cathode is exposed only to air. That region of the cell is hereinafter referred to as the $H_2$/air region: i.e. hydrogen on the anode and air on the cathode. On the other side of the moving front the anode is exposed essentially only to air; and zone 2 of the cathode flow field, opposite zone 3, is also exposed to air. That region of the cell is hereinafter referred to as the air/air region: i.e. air on both the anode and cathode.

The presence of both hydrogen and air within the anode flow field results in a shorted cell between the portion of the anode that sees hydrogen and the portion of the anode that sees air. This results in small in-plane flow of protons ($H^+$) within the membrane M and a more significant through-plane flow of protons across the membrane, in the direction of the arrows labeled $H^+$, as well as an in-plane flow of electrons ($e^-$) on each side of the cell, as depicted by the arrows so labeled. The electrons travel through the conductive catalyst layers and other conductive cell elements that may contact the catalyst layer. On the anode side the electrons travel from the portion of the anode that sees hydrogen to the portion that sees air; and on the cathode side they travel in the opposite direction.

The flow of electrons from the portion of the anode that sees hydrogen to the portion of the anode that sees air results in a small change in the potential of the electron conductor. On the other hand, electrolytes in the membrane are relatively poor in-plane proton conductors, and the flow of protons results in a very significant drop in the electrolyte potential between zones $H_2$ and 3.

It is estimated that the reduction in electrolyte potential between zones $H_2$ and 3 is on the order of the typical cell open circuit voltage of about 0.9-1.0 volts. This drop in potential results in a proton flow across the PEM, M, from the cathode side, zone 2, to the anode side, zone 3, which is the reverse direction from what occurs under normal cell operating conditions. It is also estimated that the reduction in electrolyte potential in the portion of the anode that sees air (in zone 3) results in a cathode potential in zone 2 of approximately 1.5 to 1.8 volts, versus the normal cathode potential of 0.9 to 1.0 volts. (Note: These potentials are relative to the hydrogen potential at the same operating conditions.) This elevated cathode potential results in rapid corrosion of the carbon support material and the cathode catalyst, causing significant cell performance decay.

One object of the present invention is to minimize fuel cell catalyst and catalyst support corrosion occurring during start-up of the fuel cell, and to do it without purging air from the cells with inert gas upon start-up.

In accordance with one embodiment of the start-up procedure of the present invention, a recirculation of the gases within the anode flow field, which is initially 100% air, is initiated within a recycle loop, and a limited flow of hydrogen containing fuel is provided into the recycle loop upstream of the inlet to the anode flow field to create a recirculating mixture that includes hydrogen and air. As the gas mixture circulates through the loop, hydrogen and oxygen within the mixture come into contact with the anode catalyst and react to form water, thereby depleting the recirculating stream of oxygen. When substantially all the oxygen within the recycle loop is gone, the fuel flow rate into the anode flow field is increased to normal operating levels and the primary load is connected across the cell.

Since only a mixture of air and a limited amount of hydrogen enter the anode flow field during the start-up procedure described above, there is no distinct hydrogen/air front traversing the anode flow field; and there is never a time when one region of the anode sees only hydrogen and the other sees only air. Thus, the high cathode potentials that cause catalyst and catalyst support corrosion are avoided.

Except in certain specific instances which are described later with respect to certain embodiments of the present invention, for safety reasons, the amount of hydrogen added into the recycle loop while air is present should be less than an amount that would result in a flammable mixture of hydrogen and oxygen. More than about 4% oxygen (equivalent to about 20% air), by volume, in hydrogen is considered in excess of the flammability limit; and more than about 4%, by volume, hydrogen in air is considered in excess of the flammability limit. Thus, if the recycle loop contains 100% air, the rate of hydrogen flow into the recycle loop should initially not exceed about 20% of the total recycle loop flow rate, and is preferably lower than 20% to allow a safety margin. A device for measuring the ratio of oxygen to hydrogen in the circulating gases may be placed in the recycle loop and used to control valves or other devices used to feed gases into the recycle loop.

During start-up the recirculating gas stream is partially vented (e.g. a small portion of the recirculating stream leaves the system through a vent valve) to maintain the stream at substantially ambient pressure. This also keeps the nitrogen concentration low, and eliminates any need to purge the recycle loop with hydrogen before the primary load can be connected across the cell.

In another embodiment of the start-up procedure of the present invention, the air that is present within the anode flow field at the initiation of the start-up procedure is recirculated within a recycle loop that includes at least one burner (and preferably a plurality of burners, in series) having a catalytically coated element therein. A limited amount of hydrogen containing fuel is injected directly into the burner or into the recirculating gas stream upstream of the burner; and that fuel catalytically reacts, on the catalytic element, with the oxygen in the recirculating stream to produce water and heat. (If a plurality of burners are used, it is preferable that each burner be provided with its own separate fuel flow.) The amount of hydrogen added to the burner (or to each of the series of burners) is regulated so as to minimize the amount of unconsumed hydrogen entering the anode flow field while oxygen is still present within the recycle loop, and to avoid creating a flammable mixture of hydrogen and oxygen, as discussed above. The exhaust from the burner, significantly depleted of oxygen, is circulated through the anode flow field and through the burner until the recycle loop is substantially depleted of oxygen. As in the preceding embodiment, the recycle loop is preferably purged with hydrogen before the primary load is reconnected and normal flow rates of air and fuel are delivered into the cathode and anode flow fields, respectively.

Preferably, each burner includes a diffusion burner upstream of and in series with the catalytic burner element, and preferably integrated within the same housing. The diffusion burner includes an igniter that is used to initiate the diffusion burning of the air and hydrogen entering the diffusion burner. The diffusion burning process speeds up the start-up process by more quickly consuming the oxygen in the recycle stream (as compared to catalytic burning alone); however, diffusion burning alone is not as effective as catalytic burning for removing the oxygen to the levels required of the present invention. The combination of the two provide the desired speed and substantially complete removal of the oxygen. The flammability limits, which, as discussed above, should be observed for safety within the fuel cell system, obviously do not apply to the diffusion burner; however, the flammability limits should be observed with regard to the gas composition leaving the diffusion burning zone.

To insure that the cathode potential does not rise to levels that can cause rapid rates of cathode catalyst and catalyst support corrosion during start-up, in each of the foregoing embodiments it is preferred to reduce the cell voltage to a preselected low value and to maintain or limit the cell voltage to no more than that low value throughout the start-up procedure. This may be accomplished by connecting and maintaining a small auxiliary resistive load across the cell throughout the time hydrogen is delivered into the recycle loop or into the burners during the start-up procedure. A diode in series with the auxiliary load may be used to limit the cell voltage to the preselected value. For best results, the cell voltage is limited to approximately 0.2 volts per cell, or less.

The following commonly owned U.S. non-provisional patent applications, filed on Dec. 20, 2000, describe and claim inventions related to the subject matter of this application: U.S. Ser. No. 742,497 "Procedure for Shutting Down a Fuel Cell System Using Air Purge", invented by Carl Reiser, Richard Sawyer and Deliang Yang; and U.S. Ser. No. 742,481 "Procedure for Starting Up a Fuel Cell System Using a Fuel Purge", invented by Carl Reiser, Richard Sawyer, and Deliang Yang. The following commonly owned U.S. non-provisional patent application, filed on Jan. 25, 2001, describes and claims an invention related to the subject matter of this application: U.S. Ser. No. 09/770,042 "Procedure for Shutting Down a Fuel Cell System Having an Anode Exhaust Recycle Loop", invented by Leslie Van Dine, Margaret Steinbugler, Carl Reiser, and Glenn Scheffler.

The foregoing features and advantages of the present invention will become more apparent in light of the following detailed description of exemplary embodiments thereof as illustrated in the accompanying drawings.

DETAILED DESCRIPTION OF THE INVENTION

Figure 1:
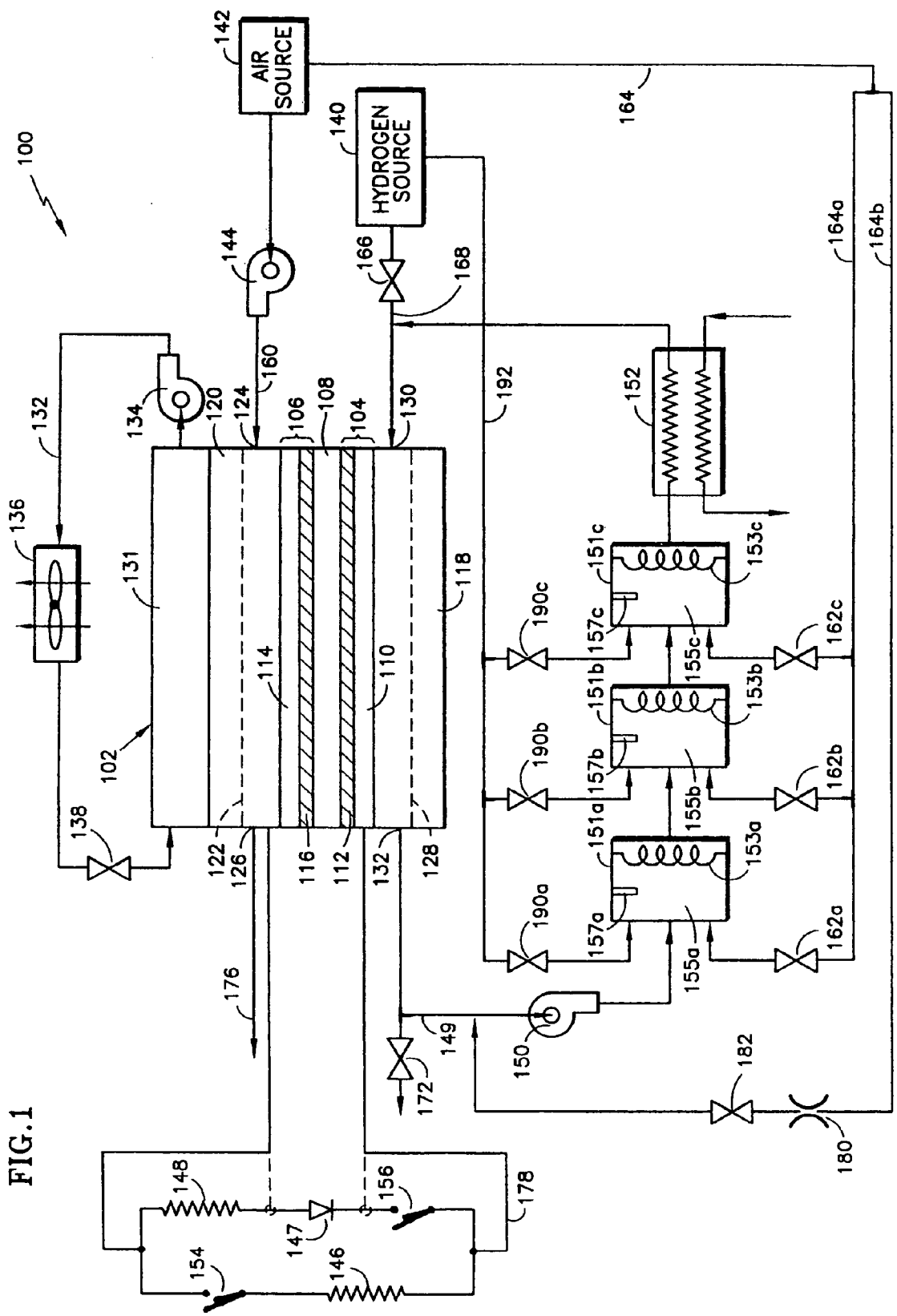
FIG. 1 is a schematic depiction of a fuel cell system that may be operated in accordance with the start-up procedures of the present invention.
Figure 2:
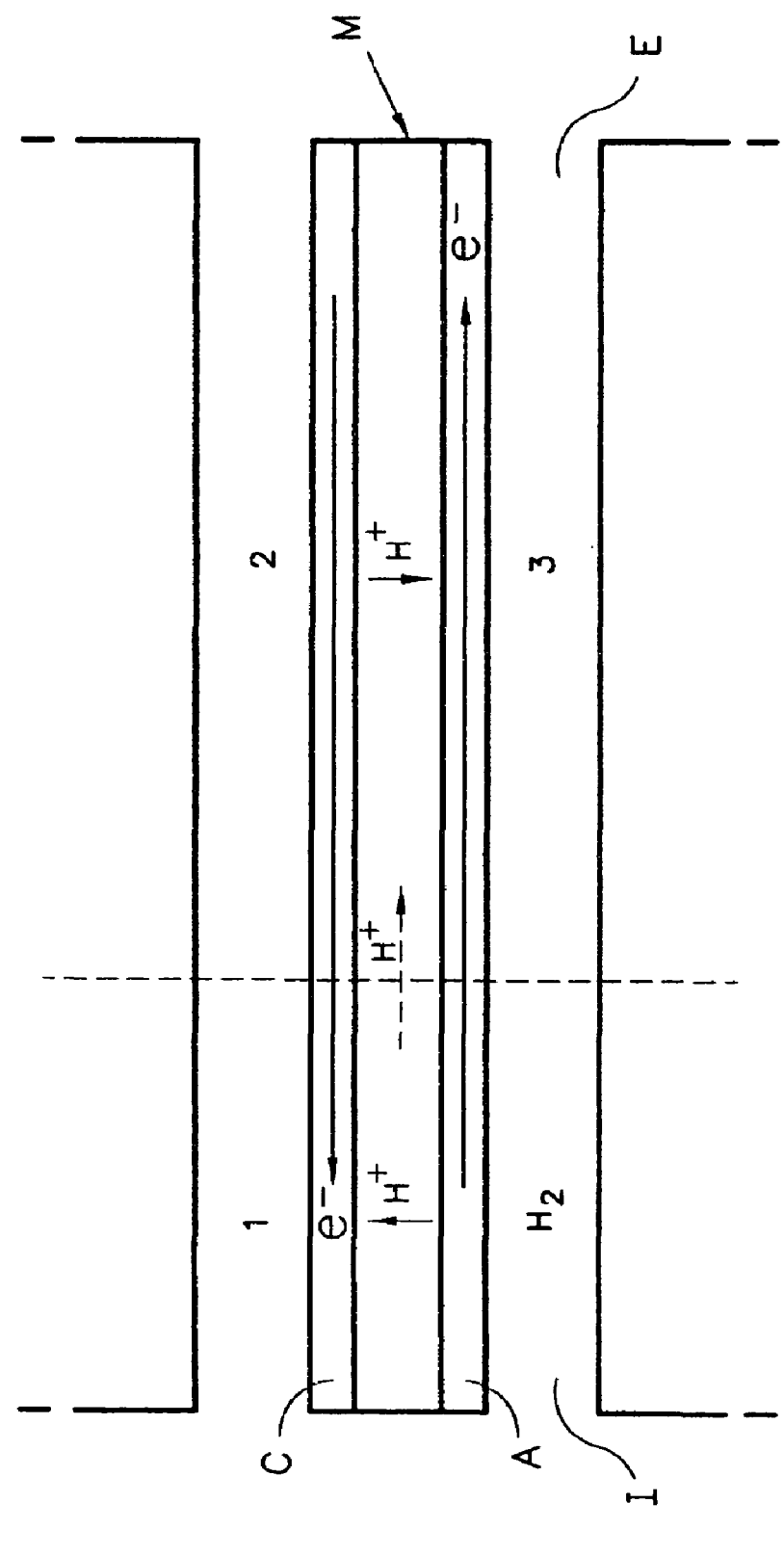
FIG. 2 is a diagrammatic view of a fuel cell cross-section used to explain a mechanism that may cause cell performance degradation during start-up and shut-down.

In FIG. 1, a fuel cell system 100 is shown. The system includes a fuel cell 102 comprising an anode 104, a cathode 106, and an electrolyte layer 108 disposed between the anode and cathode. The anode includes an anode substrate 110 having an anode catalyst layer 112 disposed thereon on the side of the substrate facing the electrolyte layer 108. The cathode includes a cathode substrate 114, having a cathode catalyst layer 116 disposed thereon on the side of the substrate facing the electrolyte layer 108. The cell also includes an anode flow field plate 118 adjacent the anode substrate 110 and a cathode flow field plate 120 adjacent the cathode substrate 114.

The cathode flow field plate 120 has a plurality of channels 122 extending thereacross adjacent the cathode substrate forming a cathode flow field for carrying an oxidant, preferably air, across the cathode from an inlet 124 to an outlet 126. The anode flow field plate 118 has a plurality of channels 128 extending thereacross adjacent the anode substrate forming an anode flow field for carrying a hydrogen containing fuel across the anode from an inlet 130 to an outlet 132. Each cell also includes a cooler 131 adjacent the cathode flow field plate 120 for removing heat from the cell, such as by using a water pump 134 to circulate water through a loop 132 that passes through the cooler 131, a radiator 136 for rejecting the heat, and a flow control valve or orifice 138.

Although only a single cell 120 is shown, in actuality a fuel cell system would comprise a plurality of adjacent cells (i.e. a stack of cells) connected electrically in series, each having a cooler separating the cathode flow field plate of one cell from an anode flow field plate of the adjacent cell. For more detailed information regarding fuel cells like the one represented in FIG. 1, the reader is directed to commonly owned U.S. Pat. Nos. 5,503,944 and 4,115,627, both of which are incorporated herein by reference. The '944 patent describes a solid polymer electrolyte fuel cell wherein the electrolyte layer is a proton exchange membrane (PEM). The '627 patent describes a phosphoric acid electrolyte fuel cell wherein the electrolyte layer is a porous silicon carbide matrix layer containing liquid electrolyte within its pores.

Referring, again, to FIG. 1, the fuel cell system includes a source 140 of hydrogen containing fuel, under pressure, a source 142 of air, an air blower 144, a primary electricity using device referred to herein as the primary load 146, a diode 147, an auxiliary resistive load 148 in series with the diode, and an anode exhaust recycle loop 149. For purposes of this application and the appended claims, the recycle loop 149 is considered to include the anode catalyst layer 112, the porous anode substrate 110, as well as the channels 128 that define the anode flow field.

Disposed in the recycle loop is a recycle loop blower 150, a plurality of burners 151a, 151b, 151c, and a recycle loop heat exchanger 152. Each burner includes an electrically heated, catalytically coated burner element therewithin designated 153a, 153b, 153c, respectively. Within each burner, upstream of each catalytic element, is a diffusion burning zone 155a, 155b, and 155c, respectively. Extending into each such zone is an igniter 157a, 157b, and 157c, respectively. A branch 164a of a conduit 164 from the air source 142 carries air to separate air feed valves 162a, 162b, 162c, which control the flow of air into each diffusion burning zone. (If desired, the air feed valves 162a, 162b, and 162c could be fixed orifices, in which case there would be a single air shut-off valve (not shown) in the conduit 164 upstream of all the air feed orifices.) A branch 164b carries air into the recycle loop, preferably upstream of the blower 150. The branch 164b includes a restricting orifice 180 and an air bleed control valve 182 for controlling the flow. A conduit 192 from the fuel source 140 carries fuel to separate fuel feed valves 190a, 190b, 190c, which control the flow of fuel into each diffusion burner zone. (If desired, the fuel feed valves 190a, 190b, and 190c could be fixed orifices, in which case there would be a single fuel shut-off valve (not shown) in the conduit 192 upstream of all the fuel feed orifices.)

Although only a single heat exchanger 152 is shown located immediately downstream of the burners, there are other possible locations for the heat exchanger, and more than one may be used. For example, there may be a heat exchanger located immediately downstream of each burner; or each burner may have a heat exchanger integral therewith. The type of heat exchanger used and its location are not considered part of the present invention.

Normal Fuel Cell Operation

During normal fuel cell operation, when the cell is providing electricity to the primary load 146, a primary load switch 154 is closed (it is shown open in the drawing), and an auxiliary load switch 156 is open. The air blower 144, the anode flow field exhaust recycle blower 150 and the coolant pump 134 are all on. The valve 182 is closed. A fuel feed valve 166 in a fuel feed conduit 168 to the anode flow field is open, as is an anode exhaust vent valve 172 in an anode exhaust conduit 174. The coolant loop flow control valve 138 is also open. The air feed valves 162a, 162b, and 162c and the fuel feed valves 190a, 190b, and 190c are closed; and the catalytic burner elements 153a, 153b, 153c are off.

Thus, during normal operation, air from the source 142 is continuously delivered into the cathode flow field inlet 124 via the conduit 160 and leaves the outlet 126 via a conduit 176. A hydrogen containing fuel from the pressurized source 140 is continuously delivered into the anode flow field via the conduit 168. A portion of the anode exhaust containing depleted hydrogen fuel leaves the anode flow field through the vent valve 172 via the conduit 174, while the recycle blower 150 recirculates the balance of the anode exhaust through the anode flow field via the recycle loop in a manner well know in the prior art. Recycling a portion of the anode exhaust helps maintain a relatively uniform gas composition from the inlet 130 to the outlet 132 of the anode flow field. As the hydrogen in the circulating gases passes through the anode flow field, it electrochemically reacts on the anode catalyst layer in a well-known manner to produce protons (hydrogen ions) and electrons. The electrons flow from the anode 104 to the cathode 106 through an external circuit 178 to power the load 146.

Start-Up Procedure

Assuming the fuel cell system described above has been shut-down and has 100% air within both the anode and cathode flow fields. The following procedures may be used to restart that system or any idle fuel cell system with air in the anode and cathode flow fields.

In a preferred start-up procedure according to the present invention, the valve 138 is opened and the coolant pump 134 is turned on. Before initiating any hydrogen flow into the system, the auxiliary resistive load 148 is optionally, but preferably, connected across the cell by closing the switch 156 in the external circuit. Application of the auxiliary load lowers cell voltage and cathode potential during the start-up process to minimize cell performance decay during the start-up procedure. Preferably the cell voltage is maintained below 0.2 volts per cell throughout start-up. Therefore, the diode 147 is selected to allow current to pass through the auxiliary load whenever the cell voltage rises above 0.2 volts per cell. In that way the cell voltage is limited to 0.2 volts per cell or less during start-up.

With the air blower 144 off and the anode exhaust vent valve 172 partially opened, the recycle loop blower 150 is turned on to initiate a recirculation of a portion of the anode flow field exhaust gases through the recycle loop 150. The primary fuel flow valve 166 remains closed. The igniters 157a, 157b, and 157c are activated; and the fuel flow valves 190a, 190b, and 190c in the conduit 192 are opened to allow a regulated, limited flow of hydrogen containing fuel into each of the diffusion zones 155a, 155b, and 155c of the burners 151a, 151b, and 151c, respectively. The hydrogen feed rate is limited such that the burner catalytic elements do not exceed 700-800° F. during operation. A hydrogen feed rate of about 18% of the recycle gas flow rate has been found to be acceptable.

In the first burner 151a, the added hydrogen and the recirculating anode exhaust enters the preferred, but optional, diffusion burning zone 155a where it is ignited by the igniter 157a. Some of the oxygen in the recirculating anode exhaust not consumed in the diffusion burning zone 155a catalytically reacts with unconsumed hydrogen on the catalytic burner element to produce water. The exhaust from the burner 151a enters the next burner in the series, and oxygen in that stream is consumed in the same manner, and so forth, until the recirculating exhaust has passed through all the burners and again passes through the anode flow field. The recirculation of the anode flow field exhaust, as well as the diffusion and catalytic burning are continued until substantially no oxygen remains within the recycle loop. As a final step in the process, a hydrogen purge of the anode flow field may be conducted.

Normal fuel cell operation may now commence by closing the valves 190a, 190b, and 190c; opening the switch 156 to disconnect the auxiliary load; opening the vent valve 172 to a normal operating position; opening the primary fuel flow valve 166 and turning on the air blower 144 so as to deliver both air from the source 142 and fresh fuel from the source 140 into their respective cathode and anode flow fields at normal operating flow rates; and closing the switch 154 to connect the primary load.

Although this preferred embodiment uses diffusion burning in conjunction with a catalytic "burning", start-up may be accomplished using catalytic burning, alone. The advantage of diffusion burning is the significantly faster speed of the start-up procedure by the more rapid burning of the oxygen. The small amounts of oxygen not consumed by the diffusion burning are consumed by catalytic reaction on the catalytic elements downstream of each diffusion burning zone. In that manner, substantially all the oxygen is removed.

Although not recommended due to the long start-up time, the fuel cell system may also be started without the use or presence of a burner in the recycle loop by simply reacting the hydrogen and oxygen on the anode catalyst. In that procedure, with the anode exhaust vent valve 172 at least partially opened, the blower 150 is turned on to initiate a recirculation of anode flow field exhaust gases (initially 100% air) through the recycle loop 150. As in other embodiments, the auxiliary load is connected to limit the cell voltage. The fuel flow valve 166 is opened to allow a limited continuous flow of hydrogen containing fuel to mix with the recirculating gases upstream of the anode flow field inlet 130. (The maximum amount of hydrogen that may be added is controlled by the flammability limits, as discussed above, and may be monitored by a sensor in the recycle loop.) As the mixture circulates through the recycle loop, the hydrogen and the oxygen in the circulating gases catalytically react within the cell on the anode in the presence of the anode catalyst to produce water. This is continued until substantially no oxygen remains in the circulating gases, at which time the auxiliary load is disconnected, the primary load is connected, and the fuel cell system may resume normal operation, as described above.

In the foregoing embodiments the auxiliary load is applied throughout the entire time that hydrogen is delivered into the recycle loop during start-up. It should be noted that benefits will be obtained if the auxiliary load is applied from any time after the hydrogen is first introduced until any time prior to substantially all the oxygen having been removed.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. A procedure for starting-up a fuel cell system that is shut down, the shut down system comprising a source of hydrogen containing fuel, a fuel cell including a cathode flow field adjacent the cathode of the cell on one side of the cell electrolyte and an anode flow field adjacent the anode of the cell on the other side of the cell electrolyte, an anode recycle loop for recirculating at least a portion of the anode flow field exhaust through the anode flow field, wherein both the anode flow field and cathode flow field are filled with air, and the primary electricity using device is disconnected from the fuel cell external circuit, the start-up procedure comprising the steps of:
   (A) initiating a recirculation, through the recycle loop, of the anode flow field exhaust, which is initially 100% air, and then providing a flow of hydrogen containing fuel into the recirculating anode exhaust to create a mixture of hydrogen and air within the recycle loop, wherein the recycle loop includes a plurality of burners disposed in series, and providing a separate flow of fuel to each burner, wherein hydrogen and oxygen are catalytically consumed within each of the burners;
   (B) catalytically reacting hydrogen and oxygen within the mixture on a catalyst within the recycle loop as the hydrogen and oxygen circulates through the recycle loop in contact with a catalyst to form water, and continuing to add hydrogen containing fuel to the recirculating mixture until substantially no oxygen remains in the recycle loop, including regulating the rate at which fuel is added such that the recirculating gases do not contain a flammable ratio of hydrogen and oxygen when they contact the catalyst or when they enter the anode flow field; and,
   (C) after substantially no oxygen remains in the recycle loop, (i) increasing the rate of fuel flow into the anode flow field to a normal operating flow rate, (ii) providing an oxidant into the cathode flow field at a normal operating flow rate, and, (iii) connecting the primary electricity using device to the external circuit.

2. The start-up procedure according to claim 1, wherein, in step (B), catalytically reacting hydrogen and oxygen includes passing the recirculating anode exhaust and hydrogen containing fuel to a burner disposed within the recycle loop, the burner including a catalytic element therein, and catalytically reacting hydrogen and oxygen on the catalytic element.

3. The start-up procedure according to claim 1, wherein, throughout step (B), the hydrogen containing fuel introduced into the recycle loop is mixed with the recirculating anode flow field exhaust, and that mixture is introduced into the anode flow field, whereupon oxygen is catalytically consumed at the cell anode in the presence of the hydrogen.

4. The start-up procedure according to claim 1, wherein prior to said step of providing a flow of hydrogen containing fuel in step (A), connecting an auxiliary resistive load across the cell to lower the cell voltage to a preselected value, and maintaining the cell voltage at or below the preselected value at least until substantially no oxygen remains in the recycle loop.

5. The start-up procedure according to claim 4, wherein the auxiliary resistive load reduces the cell voltage to 0.2 volts per cell or less, and the cell voltage is maintained at or below 0.2 volts per cell until substantially no oxygen remains in the recycle loop.

6. The start-up procedure according to claim 4, wherein during step (B) no air flow is provided to the cathode flow field while the auxiliary load is connected.

7. The start-up procedure according to claim 5, wherein the voltage is maintained at or below 0.2 volts per cell by a diode in series with the auxiliary load.

8. The start-up procedure according to claim 2, wherein prior to said step of providing a flow of hydrogen containing fuel in step (A), connecting an auxiliary resistive load across the cell to lower the cell voltage to a preselected value, and maintaining the cell voltage at or below the preselected value at least until substantially no oxygen remains in the recycle loop.

9. The start-up procedure according to claim 8, wherein said preselected value is 0.2 volts per cell.

10. The start-up procedure according to claim 8, wherein a diode is in series with the auxiliary load and limits the cell voltage to said preselected value throughout step (B).

11. The start-up procedure according to claim 4, wherein the amount of hydrogen containing fuel added in step (B) is regulated to maintain the amounts of hydrogen and oxygen entering the inlet of the anode flow field below the flammability limit.

12. The start-up procedure according to claim 4, wherein said step (B) of catalytically reacting hydrogen and oxygen includes passing the recirculating anode exhaust through a plurality of burners arranged in series within the recycle loop, each burner including a catalytic element therein, and delivering a separate controlled flow of hydrogen containing fuel into each of the catalytic burners, and catalytically reacting said hydrogen and oxygen on each of the catalytic elements to produce water.

13. The start-up procedure according to claim 12, wherein the amount of reaction air is regulated to maintain the amounts of hydrogen and oxygen mixture below the flammability limit before it comes into contact with the burner catalytic element.

14. The start-up procedure according to claim 12, wherein the cell voltage is limited to 0.2 volts per cell or less throughout step (B).

15. The start-up procedure according to claim 14, wherein a diode is in series with the auxiliary load and limits the cell voltage to 0.2 volts per cell or less throughout step (B).

16. The start-up procedure according to claim 7, wherein in step (B) the controlled amount of hydrogen added into the recirculating anode exhaust is burned, in a difussion burning zone, with oxygen in said exhaust, upstream of said catalytic element, and the exhaust from said zone is directed over said catalytic element, wherein oxygen and hydrogen remaining in said diffusion burning zone exhaust catalytically react to form water.

17. The start-up procedure according to claim 15, wherein the hydrogen to oxygen mixture of said diffusion burning zone exhaust is below the flammability limit.

18. The start-up procedure according to claim 17, wherein the rate of fuel flow into the burner is regulated to assure that the unburned gases leaving the diffusion zone of each burner, as well as the recirculating gases entering the anode flow field are always below the flammability limits.

19. The start-up procedure according to claim 11, wherein, in step(B), burning hydrogen and oxygen in a catalytic burner comprises passing the anode exhaust through a plurality of burners arranged in series, each burner including a catalytic element, and said step of providing fuel includes providing a separate flow of fuel for each catalytic burner in the series.

20. The start-up procedure according to claim 16, wherein the auxiliary resistive load reduces the cell voltage to 0.2 volts per cell or less, and the cell voltage is maintained at or below 0.2 volts per cell until substantially no oxygen remains in the recycle loop.

21. The start-up procedure according to claim 20, wherein a diode is in series with the auxiliary load and limits the cell voltage to 0.2 volts per cell or less.

22. A procedure for starting-up a fuel cell system that is shut down, the shut down system comprising a hydrogen containing fuel source, a fuel cell including a cathode flow field filled with air adjacent the cathode of the cell on one side of the cell electrolyte and an anode flow field filled with air adjacent the anode of the cell on the other side of the cell electrolyte, and an anode recycle loop for recirculating anode flow field exhaust through the anode flow field, the recycle loop including one or more burners, wherein during shut-down the primary electricity using device is disconnected from the fuel cell external circuit, the start-up procedure comprising the steps of:

(A) connecting an auxiliary resistive load across the cell;

(B) initiating a recirculation of anode flow field exhaust through the recycle loop, including through the burners, wherein the recycle loop includes a plurality of burners disposed in series, and providing a separate flow of fuel to each burner;

(C) providing a controlled flow of hydrogen containing fuel into the burners and consuming, in each burner, (i) at least some of the oxygen in the anode exhaust and (ii) at least some of the fuel provided to the burners; and (D) continuing the controlled flow of fuel into the burners and the recirculation of the anode flow field exhaust through the burners at least until there is substantially no oxygen remaining in the anode exhaust, and, thereafter, (i) providing a fuel flow to the anode flow field and air flow to the cathode flow field at normal operating flow rates, and (ii) connecting the primary electricity using device to the external circuit, wherein the auxiliary load remains connected at least until there is substantially no oxygen remaining in the anode exhaust to limit the cell voltage during the start-up process.

23. The start-up procedure according to claim 22, wherein there is a diffusion burning zone within each burner upstream of the catalytic element of each burner, and the fuel added to each burner in step (C) is added to the diffusion zone where it is ignited and diffusion burns with oxygen in the recirculating anode exhaust gases passing through the burner.

* * * * *